United States Patent [19]

Dulaney et al.

[11] Patent Number: 5,031,119

[45] Date of Patent: Jul. 9, 1991

[54] SPLIT SCREEN KEYBOARD EMULATOR

[75] Inventors: Kenneth L. Dulaney; Jeffrey C. Hawkins, both of Redwood City; Lindsay Sanford, Menlo Park; James H. McNamara, Santa Cruz, all of Calif.

[73] Assignee: Tandy Corporation, Fort Worth, Tex.

[21] Appl. No.: 364,952

[22] Filed: Jun. 12, 1989

[51] Int. Cl.[5] ............................................. G06F 15/20
[52] U.S. Cl. .................................... 364/521; 340/706
[58] Field of Search .............. 364/518, 519, 521, 523; 340/706, 707, 710, 712, 713, 716, 720, 723, 734

[56] References Cited

U.S. PATENT DOCUMENTS

| 4,755,808 | 7/1988 | Bullock et al. | 340/706 X |
| 4,766,427 | 8/1988 | Abe et al. | 340/723 X |
| 4,908,612 | 3/1990 | Bromley et al. | 340/706 |
| 4,920,514 | 4/1990 | Aoki | 340/723 X |
| 4,929,934 | 5/1990 | Ueda et al. | 340/706 |

Primary Examiner—Heather R. Herndon
Attorney, Agent, or Firm—Townsend & Townsend

[57] ABSTRACT

A system for providing keystroke data to an application program without utilizing a keyboard that simultaneously displays application program graphics and a keyboard representation on different segments of a screen. Keys are selected by touching the screen at the location of the graphic representation of the key on the screen. The system is transparent to the application program.

7 Claims, 5 Drawing Sheets

SPLIT SCREEN KEYBOARD EMULATOR

BACKGROUND OF THE INVENTION

The present invention relates generally to digital computers and, more particularly, relates to a system for facilitating interaction between a user and a computer.

Advances in technology have allowed the introduction of computers small enough to be utilized by field personnel in applications such as filling out forms, inventory control, etc. Examples include hand-held computers and laptop computers. A particularly useful method of interacting with a hand-held computer, or other type of computer, is to provide graphic icons on a screen and point to the icons using either a mouse or a touch panel that responds to the users finger or other type of pointing device.

By using a pointer type of interactive device a keyboard is not necessary and the portability of the device is increased. However, a vast amount of application programs requiring keystroke data have been developed and, ideally, the hand-held computer would allow the user to utilize this existing software.

Two methods of utilizing application programs that require keystroke data on hand-held computers have been developed. The most direct solution is to attach a keyboard to the computer via a port or include the keyboard as an integral part of the computer as in a laptop.

This solution has several drawbacks. For example, in the field environment it is not practical to carry a keyboard and this solution is practically limited to situations where the computer is not used in the field. Further, many users often prefer to use an interactive pointing device to enter all forms of data, including keystroke data, because they find it easer to point to a location on the screen than to use a key.

A second solution that obviates these drawbacks is to remove the application program graphics from the screen and to call a special program to display a keyboard on the screen. An interactive pointing device is then utilized to select the desired keys. However, for an application requiring many keystrokes the switching of programs and screens would be an impediment to efficient utilization of the application program.

SUMMARY OF THE INVENTION

The present invention is an efficient system and method for providing keystroke data to an application program without utilizing an actual keyboard. The screen display is divided into two segments. According to one aspect of the invention, the system simultaneously displays the graphics display of the application program on the first segment and a keyboard representation on the second segment. The application program is limited to affecting only the display on the first segment to prevent it from compromising the keyboard display when application program video modes are changed or display data is erased or changed in the video memory.

The system monitors an interactive pointer interface for the screen coordinates of a selected keystroke representation in the keyboard display of the second segment. If these coordinates are detected, the coordinates are translated to the keyboard data represented by the selected key. The selected keyboard data is then transferred to the application program utilizing standard software that accesses keystroke data.

The present invention is a very efficient system for generating keystroke data and is transparent to the application program. Since the application program and the keyboard representation are simultaneously displayed there is no need to switch programs to provide keystroke data.

According to another aspect of the invention, a region of the second segment may be utilized to provide data representing several keystrokes when the region is selected by the interactive pointing device.

According to a further aspect of the invention, characters may be written the second segment, converted keystroke data, and supplied to the application program.

Other features and advantages of the invention will become apparent in view of the attached figures and following detailed description.

DESCRIPTION OF THE PREFERRED EMBODIMENTS

Figure 1:
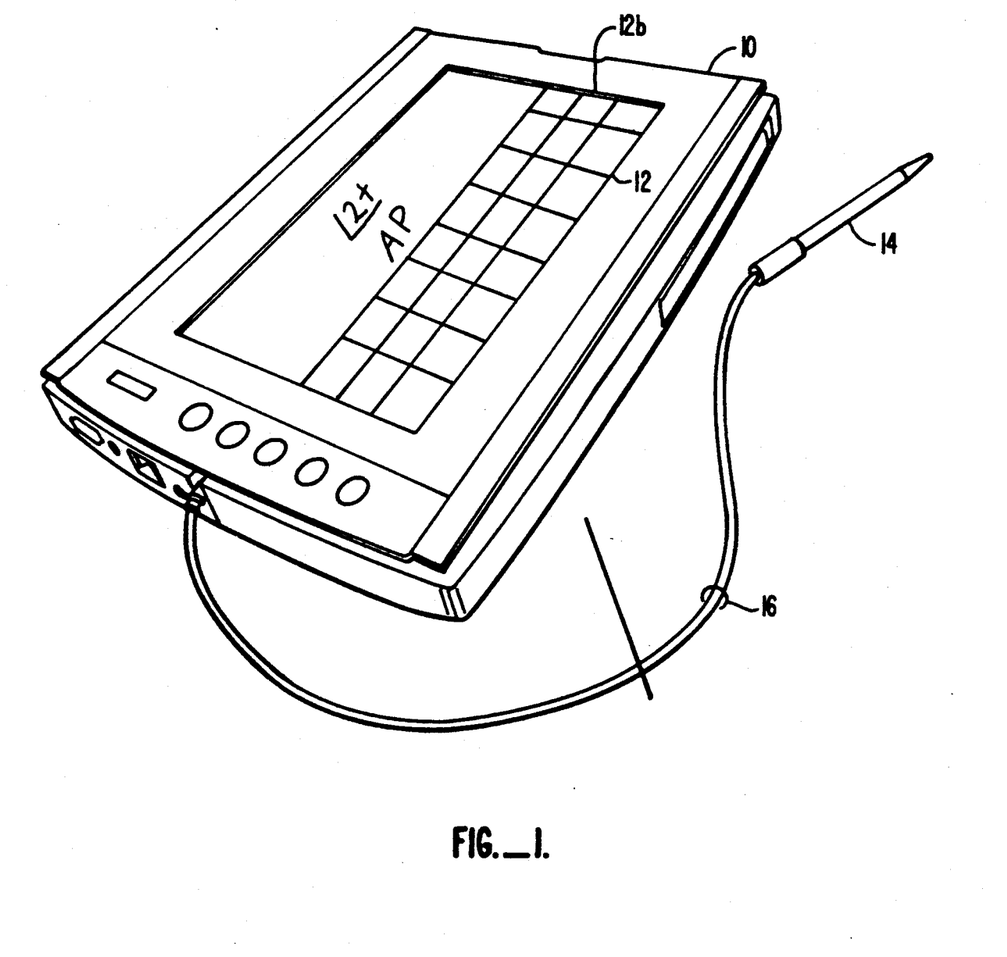
FIG. 1 is a perspective view of a preferred embodiment of the invention.

Referring now to the drawings, where identical or corresponding parts are identified by like reference numerals throughout the several views, FIG. 1 is a perspective view of a preferred embodiment of the invention. In FIG. 1, a hand-held computer is enclosed in a plastic case 10 having a 640×400 pixel LCD screen 12 disposed on an upper surface. An electrically conductive pen 14 is attached to the case by a wire 16. A thin glass overlay (not shown) having an electric coating on its upper surface is placed over the screen 12. An electric field is generated on the conductive surface utilizing electric contacts as described, for example, in U.S. Pat. No. 4,371,746. When the pen 14 is touched to the screen overlay, the magnitude of the field is sensed and an overlay controller, which is part of the computer, determines the screen coordinates of the point of contact. Thus the pen 14 functions as an interactive pointer interface to programs being executed by the computer.

In a preferred embodiment, the application programs utilize the CGA mode allowing 25 lines of characters formed on a 640×200 pixel grid. However, as described above, the display screen 12 utilized is a 640×400 pixel grid that facilitates other unique features of the computer. To compensate for the extra pixels when a keyboard emulation option is not used and an application program utilizing the CGA character mode is being executed, the system modifies the standard CGA image to fit the 640×400 pixel screen 12. This modification feature is transparent to the application program and results in the display of the application program graphics on the entire screen.

If the application program is of the type that responds to an interactive pointer device such as a mouse, light pen or the like, the coordinates generated by contacting the screen 12 with the pen in an appropriate location can be converted by software to a form usable by the application program. The computer depicted in FIG. 1 includes a port for attaching a keyboard.

In a preferred embodiment, a keyboard, and possibly other graphics, are displayed on the bottom half 12b of the screen 12 by the keyboard emulation system (KBES) of the invention. Since the size of the top half of the screen 12t is the standard CGA, size it is possible for the application program graphics to be displayed on the top half 12t and be unaffected by the presence of the displayed keyboard.

The keyboard display includes characters or graphics representing each key of a keyboard that would ordinarily be utilized by the application program. If a keystroke is required by the application program, the user selects a keystroke by touching the conductive pen 14 to the location of the characters on the screen 12 representing the required keystroke. The selected keystroke data is supplied to the application program by the KBES as if the keystroke was generated by depressing and releasing a key on an actual keyboard. The presence of the keyboard display on the lower half of the screen 12b and the operation of the KBES is transparent to the application program and requires no modification to the application program or special procedures for the user. Additionally, the pen 14 may continue to be used with the application program while also being used to supply keystroke data when the computer is in the keyboard emulation mode. For example, the pen 14 may emulate a mouse when used to interact with the application program graphics displayed in the top segment 12t and be used to enter keystroke data by touching the display on the bottom segment 12b.

Figure 2:
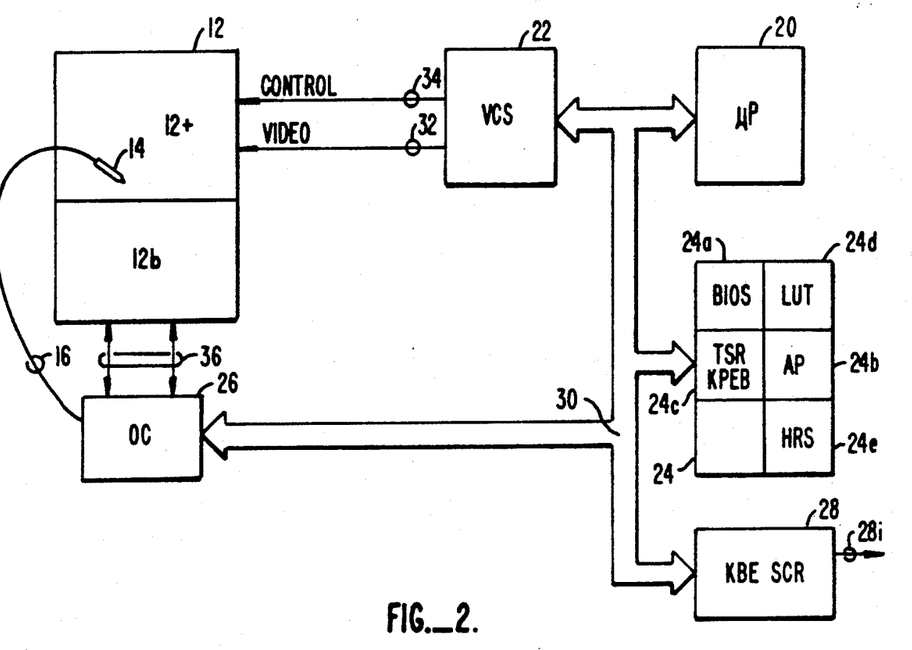
FIG. 2 is a block diagram of a preferred embodiment of the keyboard emulation system.

A block diagram of the KBES is depicted in FIG. 2. Referring now to FIG. 2, a system processor 20, video control system (VCS) 22, system memory (SMEM) 24, overlay controller 26, and keyboard scan code register 28, having an output connected to an interrupt line 28I, are coupled to the system data bus (DBUS) 30.

The VCS 22 is connected to the screen 12 by video signal and control lines 32 and 34. The overlay controller 26 is connected to the screen overlay by electrical interconnection lines 36 and is also connected to the conductive pen 14 by the wire 16. During the keyboard emulation mode a BIOS 24a, application program 24b, terminate and stay resident keyboard emulation program (KPEP) 24c, and look up table (LUT) 24d are stored in the SMEM 24.

Figure 3:
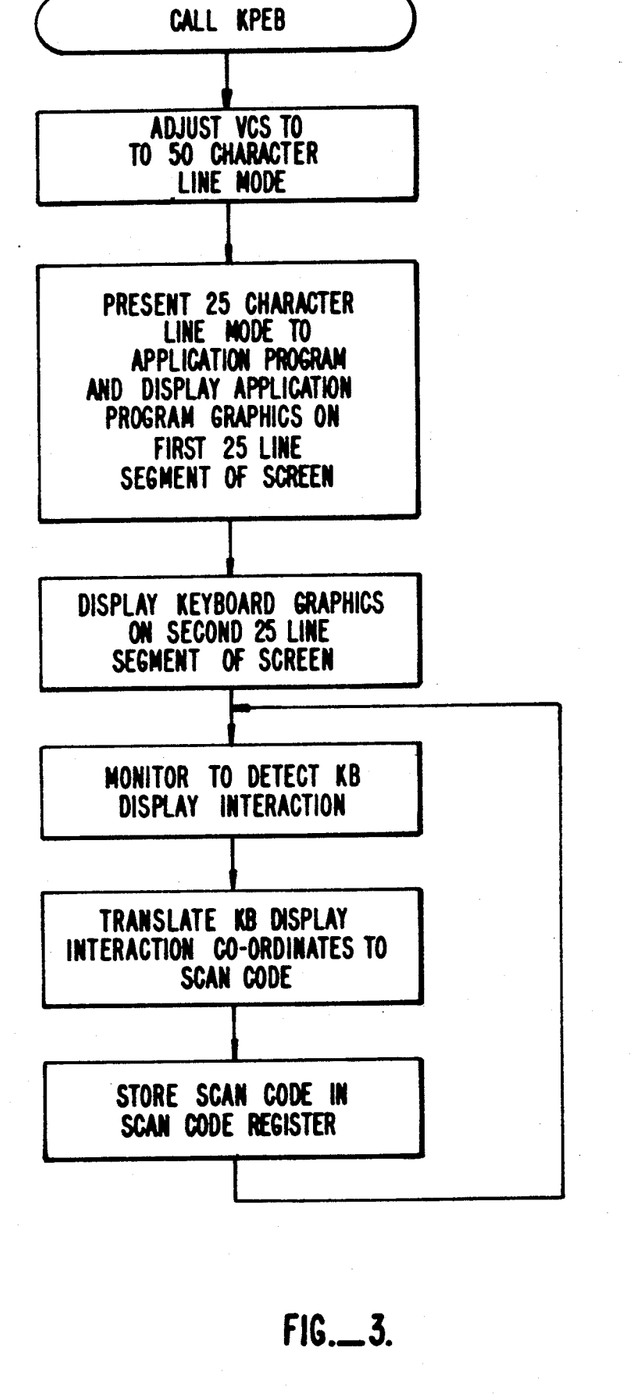
FIG. 3 is a flow chart illustrating the operation of the embodiment of FIG. 2.

The operation of the system of FIG. 2 will now be described with reference to the flow chart of FIG. 3. When the keyboard emulation mode is initiated the special TRS (terminate and stay resident) keyboard emulation program (KBEP) 24c is called. The KBEP 24c adjusts the VCS 22 to place the screen in the 50 character line mode to present a 25 line character mode to the application program and to display the application program graphics on the upper 25 line segment 12t of the screen 12. The KBEP 24c simultaneously displays a graphic depiction of a keyboard on the lower 25 line segment 12b of the screen 12.

The KBEP monitors the overlay controller 26 for the presence of a keyboard display interaction that occurs when a user touches the pen 14 to the position of the character in the keyboard display representing a particular key that is to be selected. When a keyboard display interaction is detected the pixel coordinates provided by the overlay controller 26 are translated by the KPEP to a scan code representing the keystroke data indicated by the character contacted by the pen 14.

There are several alternatives to displaying a keyboard in the bottom segment 12b. Labelled regions representing sets of keystrokes could be displayed. If a region were touched by the pen 14 the coordinates would be translated to a series of corresponding scan codes by the KPEP 24c.

Additionally, handwriting recognition software 24e stored in the system memory could be utilized to translate coordinates of alphanumeric characters, or other types of symbols such as Chinese or Japanese characters, written with the pen 14 on the bottom half of the screen into corresponding keystroke scan codes. These scan codes would then be supplied to the application program by the KPEP 24c.

One mode of implementing a translation is to store the scan codes represented by the character displayed on the screen in the location of the LUT 24d accessed by the coordinates of the location on the screen 12 of the character displayed on the screen. The KPEP utilizes the coordinates provided by the overlay controller 26 to access the scan code from the LUT 24d.

The KPEP then stores the scan code in the keyboard scan code register 28. The hardware of the keyboard scan code register 28 is designed so that a signal is set on the interrupt line 28I when the scan code is stored in the keyboard scan code register 28.

Figure 4:
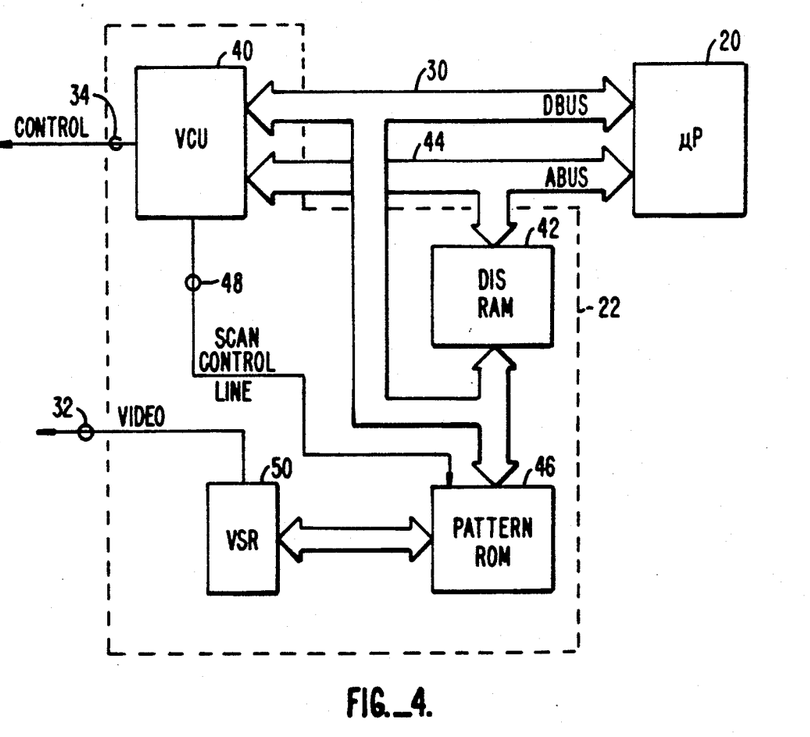
FIG. 4 is a block diagram of the video control unit.

FIG. 4 is a block diagram of a representative video control system 22 utilized in the preferred embodiment of the system. In FIG. 4, the system processor 20, a video control unit 40, and a display RAM 42 are connected by the DBUS 30 and address bus (ABUS) 44. Additionally, a pattern ROM 46 is connected to the ABUS 44 and to the video control unit 40 by a scan control line 48. The data output of the pattern ROM 46 is connected to the parallel input of a video shift register 50 and the serial output of the video shift register 50 is coupled to a display unit, including the screen 12, by the video line 32.

In standard character mode operation, the screen 12 is divided into a predetermined number of sequentially addressed character locations. The display RAM 42 includes the same predetermined number of sequentially addressed 8-bit storage locations with the address of each storage location corresponding to the address one of the character locations. During execution of an application program, the system processor 20 writes the ASCII code to be displayed at each character location in the display RAM storage location corresponding to the character location.

As is well known in the art, each character location is an $m \times n$ matrix of pixels. The $m \times n$ dot pattern for a particular ASCII character is stored at location in the pattern ROM 46 having an address partially formed by the ASCII code for the character to be displayed. The screen display is formed one pixel row at a time. Thus, during a display operation, the video control unit 40 sequentially transfers the addresses of the character locations in a given row of the display to the ABUS 44 so that the display RAM 42 outputs the ASCII code for each character to be displayed. In addition, a signal is transferred to the scan control line 48 that indicates which pixel row of the character matrix is to be displayed. The pattern ROM 46, in response to the ASCII code and scan control signal, transfer the correct pixel signals to the parallel input of the video shift register 50 which then serially shifts the pixel signals onto the video line 32.

Figure 5:
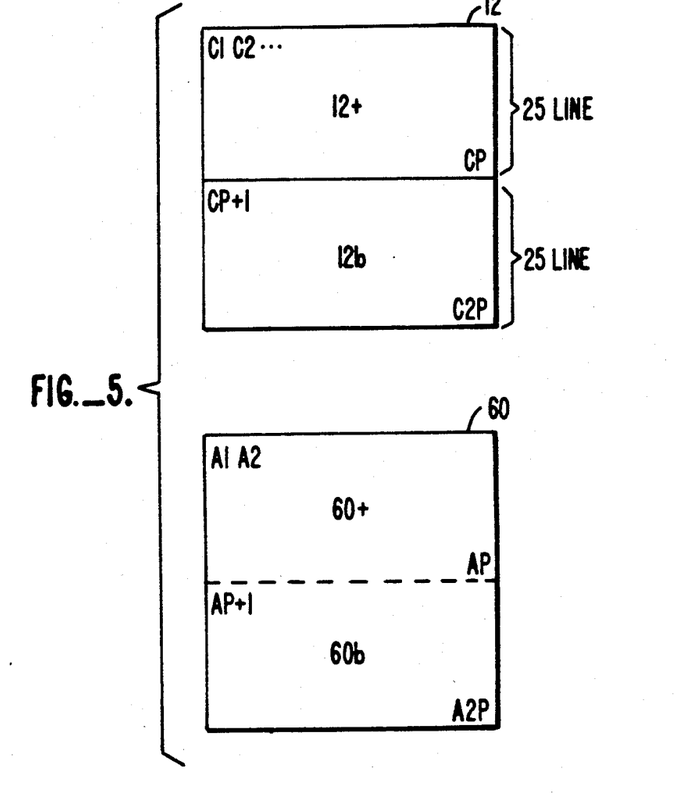
FIG. 5 is a block diagram depicting the character locations of a display and the address space of the display RAM.
Figure 6:
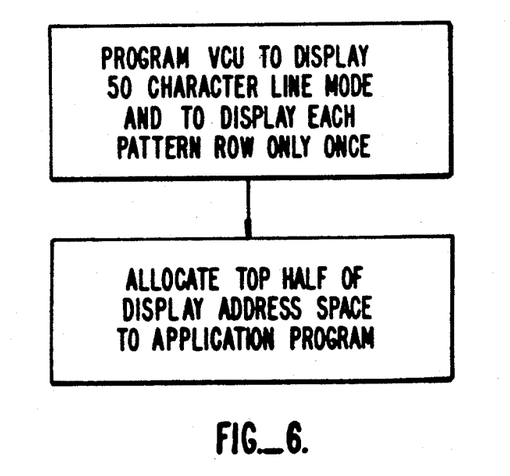
FIG. 6 is a flow chart illustrating the operation of the video control system.

The operation of the VCS 22 during the keyboard emulation mode will now be described with reference to FIGS. 5 and 6. FIG. 5 depicts the screen 12 in a 50 line mode and the address space 60 of the display RAM 42 to support the 50 line mode. The predetermined number (C1 to CP) of character locations 12c in the top half 12t of the screen represent the standard CGA character mode and are utilized to display the graphics of the application program. The first predetermined number (A1 to AP) of addresses in the first half 60t of the address space 60 correspond to upper display 12t and are accessible to the application program. The second predetermined number of addresses (AP+1 to A2P) in the second half 60b of the address space 60 correspond to character locations (CP+1 to C2P) of the lower half 12b of the screen and store the ASCII codes for the keyboard display. In the embodiment being described, hardware limitations require that address spaces 60t and 60b be contiguous. Generally, the address space 60t is not affected by an application program. However in other embodiments, hardware support could be provided to locate the address space 60b for the second segment display data in an area not accessible to the application program to assure complete isolation.

Figure 7:
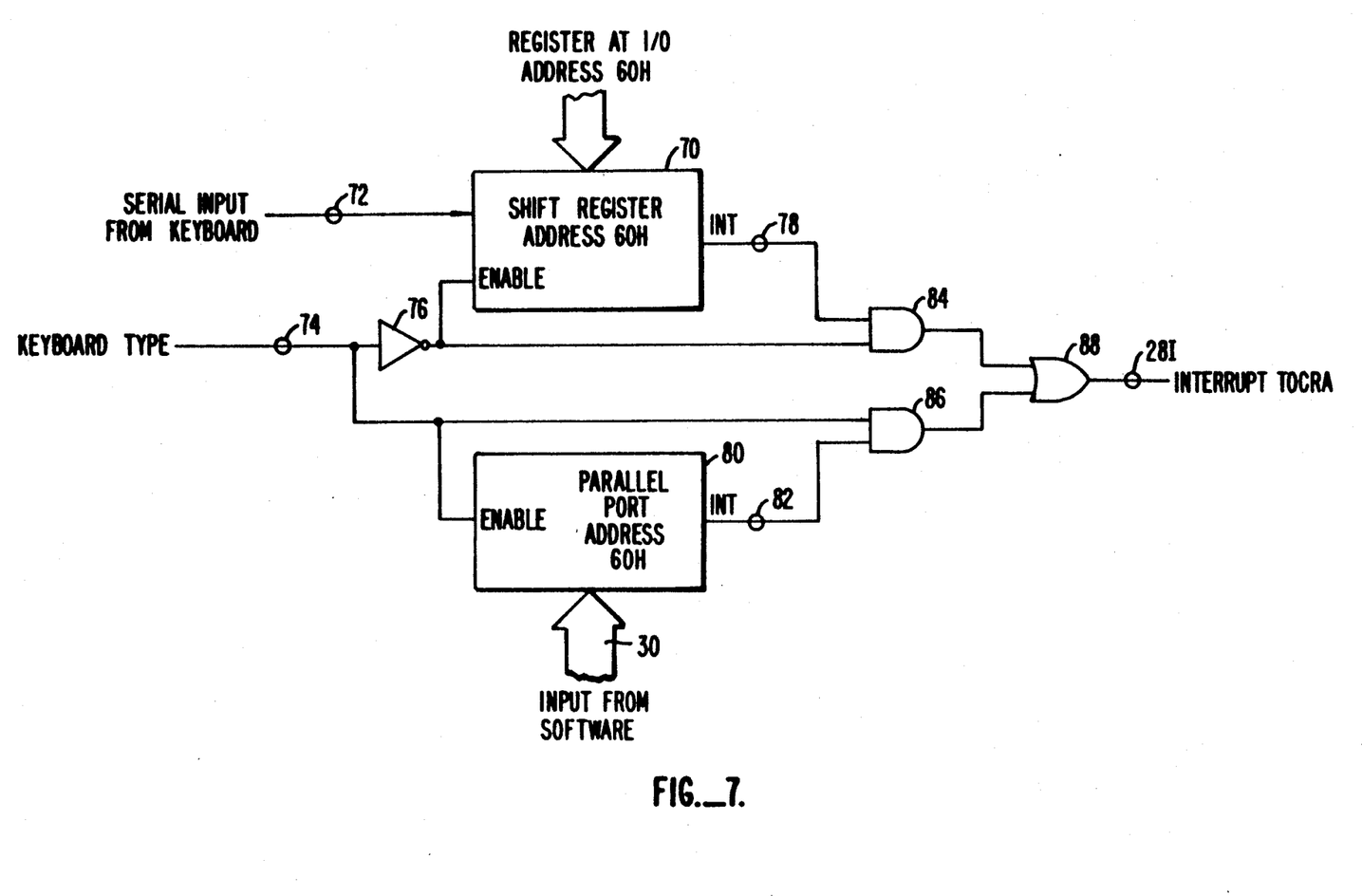
FIG. 7 is a schematic diagram of the keyboard scan control register configuration.

The operation of the system described with reference to FIGS. 4 and 5 will now be described with reference to the flow chart of FIG. 6. The video control unit is programmed to display a 50 character line mode. Since the screen is now divided into 50 character lines each character location is an m×n pixel matrix that correspond to the m×n pattern in the pattern ROM 46. Accordingly, the video control unit 40 is programmed to display each row of each character pattern only once. The top half 60t of the display RAM address space is allocated to the application program. Thus, the application program address space spans addresses A1 through AP so that the changing of video modes or erasing video memory does not affect the display of the keyboard on the lower half 12b of the screen FIG. 7 is a detailed block diagram of a keyboard scan code register 28 configuration that allows the KBEP to generate keyboard scan codes that cannot be distinguished in any way from real hardware scan codes generated by pressing and releasing a key on the keyboard of an IBM PC XT compatible computer (PC-XT). In FIG. 7, a first scan code shift register 70 has a serial input coupled to a KBI line 72, an enable input coupled to a KB type line 74 via inverter 76, a parallel output coupled to the DBUS 30, and a first interrupt output coupled to a first INT line 78. A second register 80 has a parallel I/O port coupled to the DBUS 30, an enable input coupled to the KB type line 74, and an second interrupt output coupled to a second interrupt line 82. A first AND gate 84 has first and second inputs coupled to the first INT line 78 and the inverted KB type line 74, respectively, and a second AND gate 86 has first and second inputs coupled to the KB type line 74 and the second INT line, respectively. The outputs of the first and second AND gates 84 and 86 are connected to an OR gate 88, with the output of OR gate 86 coupled to the interrupt line 28I. The first and second registers 70 and 80 are connected to the DBUS 30 at I/O port address 60H.

If an actual keyboard is connected to the computer, a false signal, reset when the computer is initialized or when the KPEP is terminated, on the KB type line indicates that the computer is not in the keyboard emulation mode, disables the second register 80, enables the first register 70, closes the second AND gate 86, and opens the first AND gate 84. In a PC-XT the scan code from the keyboard is serially shifted into the first shift register 70 through the KBI line 72. When the entire scan code has been shifted the first register 70 automatically generates a hardware interrupt signal on the first interrupt line 78. In response to this interrupt, a standard PC-XT interrupt service routine reads the data from I/O port address 60H and services the interrupt. The interrupt service routine processes the scan code stored in the first register 70 and issues an end of interrupt (EOI) signal to reset the interrupt generated by the first register 70.

In the keyboard emulation mode, a true signal on the KB type line 74, set by the KPEP, indicates that the computer is in the keyboard emulation mode, enables the second register 80, disables the first register 70, opens the second AND gate 86, and closes the first AND gate 84. When a keyboard interaction causes the KBEP to generate the scan code of the key selected from the keyboard display, the KBEP stores the scan code in the second register 80. The second register 80 automatically generates an interrupt signal on the second interrupt line 82 when the keystroke scan data is written to the second register 80.

The hardware generation of the interrupt by the second register 80 in the keyboard emulation mode is necessary if the keyboard emulation mode is to be transparent to the application program. If the interrupt were generated by software a non-standard interrupt service routine would be required that does not assume a hardware interrupt.

The invention has now been described with reference to the preferred embodiments. However, modifications and substitutions will now be apparent to persons of ordinary skill in the art. For example, the size of the screen or the particular display format is not critical to practicing the invention. The principles disclosed are applicable to any format or screen size. Further, a character type display has been described, however, a bit-mapped display could also be utilized. The screen would still be divided between the application program graphics and the keyboard display. Additionally, other types of interactive pointer interface devices, such as a mouse, could be utilized. Accordingly, the invention is not intended to be limited except as provided by the appended claims.

What is claimed is:

1. In a general purpose computer of the type that executes an application program that generates a display output and includes a screen for displaying the display output of the application program being run on the computer and includes keystroke storage hardware, with the application program of the type that processes keystroke data entered by depressing and releasing a key on a keyboard connected to the computer and accesses keystroke data from the keystroke data storage hardware according to a predetermined standard process, a system for providing keystroke data to the application program without utilizing a keyboard, said system comprising:

means for dividing the screen into a first segment and a second segment;

means for displaying the application program display output in said first segment;

means for limiting the application program from interacting with said second segment;

interactive pointing means for generating screen coordinates of selected locations on the screen;

means, coupled to said interactive pointing means, for detecting said generated screen coordinates;

means, coupled to said means for detecting, for converting detected coordinates in said second segment to input keystroke data; and means, coupled to said means for converting, for storing said converted input keystroke data and for emulating the standard keystroke storage hardware in the computer so that the application program can access said converted keystroke data utilizing the predetermined standard process.

2. The invention of claim 1 wherein said means for converting further comprises:

means for displaying a keyboard display including keystroke representations having coordinates corresponding to selected keystroke data.

3. The invention of claim 1 wherein said means for converting further comprises:

means for recognizing the coordinates forming a written character on said second segment; and means for converting said formed written character to corresponding keystroke data.

4. The invention of claim 1 wherein said means for storing said converted input keystroke data and for emulating the standard keystroke storage hardware comprises:

keyboard scan register, having a same I/O port address as the keystroke storage hardware in the computer, that generates a hardware interrupt signal when loaded with keystroke data by said system for providing keystroke data without utilizing a keyboard so that the application program cannot detect that the keystroke data was not generated by utilizing a key on an actual keyboard;

means, coupled to said keyboard scan register, for selecting said keyboard scan register instead of the standard keyboard storage hardware when an actual keyboard is not being utilized.

5. In a general purpose computer of the type that executes an application program that generates a display output and includes a screen for displaying the display output of the application program being run on the computer and includes keystroke storage hardware, with the application program of the type that processes keystroke data entered by depressing and releasing a key on a keyboard connected to the computer and accesses keystroke data from the keystroke data storage hardware according to a predetermined standard process, a system for providing keystroke data to the application program without utilizing a keyboard, said system comprising:

means for dividing the screen into a first segment and a second segment;

means for simultaneously displaying the application program display output in said first segment and a keystroke data selection display in said second segment, with the keystroke data selection display including a region corresponding to a selected groups of keystrokes;

means for preventing the application program from affecting keystroke data selection display on said second interactive pointing means for generating screen coordinates of a selected location on the screen;

means, coupled to said interactive pointing means, for detecting generated screen coordinates of said region;

means, coupled to said means for detecting, for converting said detected coordinates of said region to input keystroke data corresponding to said selected group of keystrokes; and means, coupled to said means for converting, for storing said converted input keystroke data and for emulating the standard keystroke storage hardware in the computer so that the application program can access said converted keystroke data utilizing the predetermined standard process.

6. In a general purpose computer of the type that executes an application program that generates a display output and includes a screen for displaying the display output of the application program being run on the computer and includes keystroke storage hardware, with the application program of the type that processes keystroke data entered by depressing and releasing a key on a keyboard connected to the computer and accesses keystroke data from the keystroke data storage hardware according to a predetermined standard process, a system for providing keystroke data to the application program without utilizing keyboard, said system comprising:

means for dividing the screen into a first segment and a second segment;

means for simultaneously displaying the application program display output in said first segment and a keyboard display in said second segment, with the keyboard display including representations, at corresponding locations of said second segment, of the keys of a keyboard;

means for limiting the application program from affecting the keyboard display on said second segment;

interactive pointing means for generating screen coordinates of a selected location on the screen;

means, coupled to said interactive pointing means, for detecting said generated screen coordinates of said selected screen location of a key representation;

means, coupled to said means for detecting, for converting said detected coordinates to input keystroke data corresponding to the key representation at said detected coordinates on said screen; and means, coupled to said means for converting, for storing said converted input keystroke data and for emulating the standard keystroke storage hardware in the computer so that the application program can access said converted keystroke data utilizing the predetermined standard process.

7. In a computer system that includes a display screen, that executes application programs that include a display output displayed on the screen and requires keystroke data as a data input, that utilizes standard software to access keystroke data stored in a keystroke data storage register when the application program requires keystroke data as input data, and that includes an interactive pointing interface to the screen for selecting screen coordinates as data inputs, a method for emulating a keyboard and providing keystroke data required by the application program without the use of a keyboard, said method comprising the steps of:

simultaneously displaying application the application program display output and a keyboard display on different segments of the screen;

preventing the application program from affecting the keyboard display when the application program changes the application program display output displayed on the screen;

selecting the coordinates of a given keystroke representation in said keyboard display;

translating said selected coordinates to selected keystroke data corresponding to said given keystroke;

providing a keyboard scan register that emulates the operation of the keystroke data storage register;

substituting said keyboard scan register for the keystroke data storage register so that the standard software accesses keystroke data from said keyboard scan register; and storing said translated keystroke data in said keyboard scan register so that the access of said translated keystroke data is transparent to the application program.

* * * * *

UNITED STATES PATENT AND TRADEMARK OFFICE
CERTIFICATE OF CORRECTION

PATENT NO. : 5,031,119

DATED : July 9, 1991

INVENTOR(S) : Kenneth L. Dulaney, et al.

It is certified that error appears in the above-identified patent and that said Letters Patent is hereby corrected as shown below:

In claim 5, at column 8, line 3, change "second" to --second segment;--.

In claim 6, at column 8, line 30, change "utilizing keyboard," to --utilizing a keyboard,--.

In claim 7, at column 9, line 3 change "application the application" to --the application--.

Signed and Sealed this

Thirtieth Day of November, 1999

Attest:

Q. TODD DICKINSON

Attesting Officer

Acting Commissioner of Patents and Trademarks